US008276471B2

(12) United States Patent
Heichel et al.

(10) Patent No.: US 8,276,471 B2
(45) Date of Patent: Oct. 2, 2012

(54) VIBRATION GENERATOR

(75) Inventors: Christian Heichel, Niedernberg (DE); Albrecht Kleibl, Schaafsheim (DE)

(73) Assignee: ABI Anlagentechnik-Baumaschinen-Industriebedarf Maschinenfabrik und Vertriebsgesellschaft, Niedernberg (DE)

( * ) Notice: Subject to any disclaimer, the term of this patent is extended or adjusted under 35 U.S.C. 154(b) by 613 days.

(21) Appl. No.: 12/456,842

(22) Filed: Jun. 23, 2009

(65) Prior Publication Data

US 2010/0000351 A1 Jan. 7, 2010

(30) Foreign Application Priority Data

Jul. 1, 2008 (EP) .................................... 08011830

(51) Int. Cl.
*F16H 21/00* (2006.01)
*F16H 33/00* (2006.01)

(52) U.S. Cl. ................................................ 74/25; 74/61

(58) Field of Classification Search ................ 74/25, 44, 74/45, 47, 49, 55, 61, 595, 600, 837; 384/447
See application file for complete search history.

(56) References Cited

U.S. PATENT DOCUMENTS

| | | | | |
|---|---|---|---|---|
| 3,410,477 | A * | 11/1968 | Hartley | 417/534 |
| 4,078,439 | A * | 3/1978 | Iturriaga-Notario | 74/53 |
| 4,230,026 | A * | 10/1980 | Hartley | 92/138 |
| 5,503,038 | A * | 4/1996 | Aquino et al. | 74/49 |
| 5,871,277 | A * | 2/1999 | Lash | 366/124 |
| 2005/0235764 | A1* | 10/2005 | Johnson | 74/55 |

FOREIGN PATENT DOCUMENTS

| | | |
|---|---|---|
| DE | 196 39 786 | 4/1998 |
| DE | 196 39 787 | 4/1998 |

* cited by examiner

*Primary Examiner* — Phillip A Johnson
(74) *Attorney, Agent, or Firm* — Collard & Roe, P.C.

(57) ABSTRACT

A vibration generator has a piston guided in linear manner, which is connected with a crankshaft by way of a connecting rod. The piston is connected with the connecting rod by way of a piston pin bearing, and the crankshaft is connected with the connecting rod by way of a crank journal. The crank journal bearing is disposed within the piston pin bearing.

7 Claims, 3 Drawing Sheets

VIBRATION GENERATOR

CROSS REFERENCE TO RELATED APPLICATIONS

Applicants claim priority under 35 U.S.C. §119 of European Application No. 08011830.0 filed Jul. 1, 2008.

BACKGROUND OF THE INVENTION

1. Field of the Invention

The invention relates to a vibration generator comprising a piston guided in a linear manner, which is connected with a crankshaft by a connecting rod. The piston is connected with the connecting rod by a piston pin bearing, and the crankshaft is connected with the connecting rod by a crank journal.

2. The Prior Art

In construction, vibration generators such as vibrators, shakers, or vibration bears, are used to introduce profiles into the ground, or to draw them from the ground, or also to compact ground material. The ground is excited by the vibration, and thereby achieves a "pseudo-fluid" state. The goods to be driven in can then be pressed into the construction ground by a static top load. The vibration is characterized by a linear movement and is generated by rotating imbalances that run in opposite directions, in pairs, within a vibrator drive. The rotating imbalance masses bring about a force effect that describes a sine curve, over time. Such a drive acts alternately in the forward drive direction and counter to it, with time offset. The forward drive direction is determined, in the final analysis, by means of static forces, such as the inherent weight and static top loads. Without the superimposition of static forces on the vibration, the material being driven would not move forward, but rather simply vibrate back and forth.

To overcome the aforementioned disadvantages, German Patent Application DE 196 39 786 A1 proposes to dispose an imbalance mass mounted so as to rotate, in the manner of a crank gear mechanism, offset by a defined eccentricity perpendicular to its drive shaft. Because of the eccentricity, the imbalance mass performs a rotation at non-uniform angular velocity while the angular velocity of the drive remains constant, so that the amount of the centrifugal force changes as a function of its direction. The rotating slider crank mechanism described in DE 196 39 787 A1 shows a comparatively simpler structure. Such rotating slider crank mechanisms have a simple structure and furthermore demonstrate little noise development.

However, it is a disadvantage of the previously known systems that the geometric conditions prove to be very problematic. The directed work method of the rotating slider crank mechanism is based on the fact that the connecting rod is structured to be small relative to the crank radius. In contrast, the crank radius itself has to be minimized, however, in order to limit the idle power, which increases as the square of the piston path. Furthermore, because of the geometry, the connecting rod must be structured to be longer than the sum of the radii of the crank journal and piston pin bearings. However, these bearings must be structured to have a size in accordance with the forces that are applied. To fulfill the aforementioned contradictory requirements, the connecting rod length and the crank radius must be selected to be appropriately great; the resulting great idle power can be countered by a large mass inertia moment of the crankshaft provided by the design. It is a disadvantage of this arrangement that the vibration generator is dimensioned to be large and heavy, resulting in unnecessarily great speeds and friction powers.

SUMMARY OF THE INVENTION

It is therefore an object of the invention to provide a vibration generator in the manner of a rotating slider crank mechanism, which has a low construction height and in which the speeds and friction powers that can be achieved are furthermore reduced. According to the invention, this task is accomplished in that the crank journal bearing is disposed within the piston pin bearing.

With the invention, a vibration generator in the manner of a rotating slider crank mechanism is created, which has a low construction height and in which the speeds and friction powers that can be achieved are reduced.

In a further development of the invention, the piston is configured in such a manner that the crankshaft is disposed in the piston in a centered manner. Since the connecting rod forces engage in the center of the piston, the bearing forces between the piston and the cylinder in which the piston is guided are reduced.

In an embodiment of the invention, the connecting rod is configured as a disk that is disposed to move in a slide bearing. Here, the "connecting rod length" is independent of the bearing diameters, and is limited only by the crank radius.

In a further embodiment of the invention, two crank journal bearings are disposed diametrically opposite one another within the piston pin bearing. By disposing the crankshaft in the opposite piston pin bearing, it is possible to reverse the direction of the vibration generator.

In an alternative embodiment of the invention, the piston pin bearing is disposed to be displaceable within the crank journal bearing. In this way, a change in the relative position with regard to the center point of the connecting rod disk is made possible, thereby again making it possible to achieve a direction reversal of the vibration generator.

In a further development of the invention, the connecting rod disk has means for a relative change in position of the crank journal bearing. In this way, a simple direction reversal as well as an adjustment of the amplitude of the vibration generator can be achieved.

Preferably, the means for the relative change in position comprise at least one hydraulic cylinder that is disposed orthogonal to the crank journal of the connecting rod disk. The crank journal bearing is displaceable in the connecting rod disk by the hydraulic cylinder.

In another embodiment of the invention, at least one resiliently mounted impact piece is disposed within the piston. In this way, the force effect is reinforced at the lower reversal point of the piston, and reduced at the upper reversal point. In this connection, the spring can be configured in such a manner that the impact piece reaches the piston housing and thus supports it in the pile-driving direction, when hard impacts occur.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
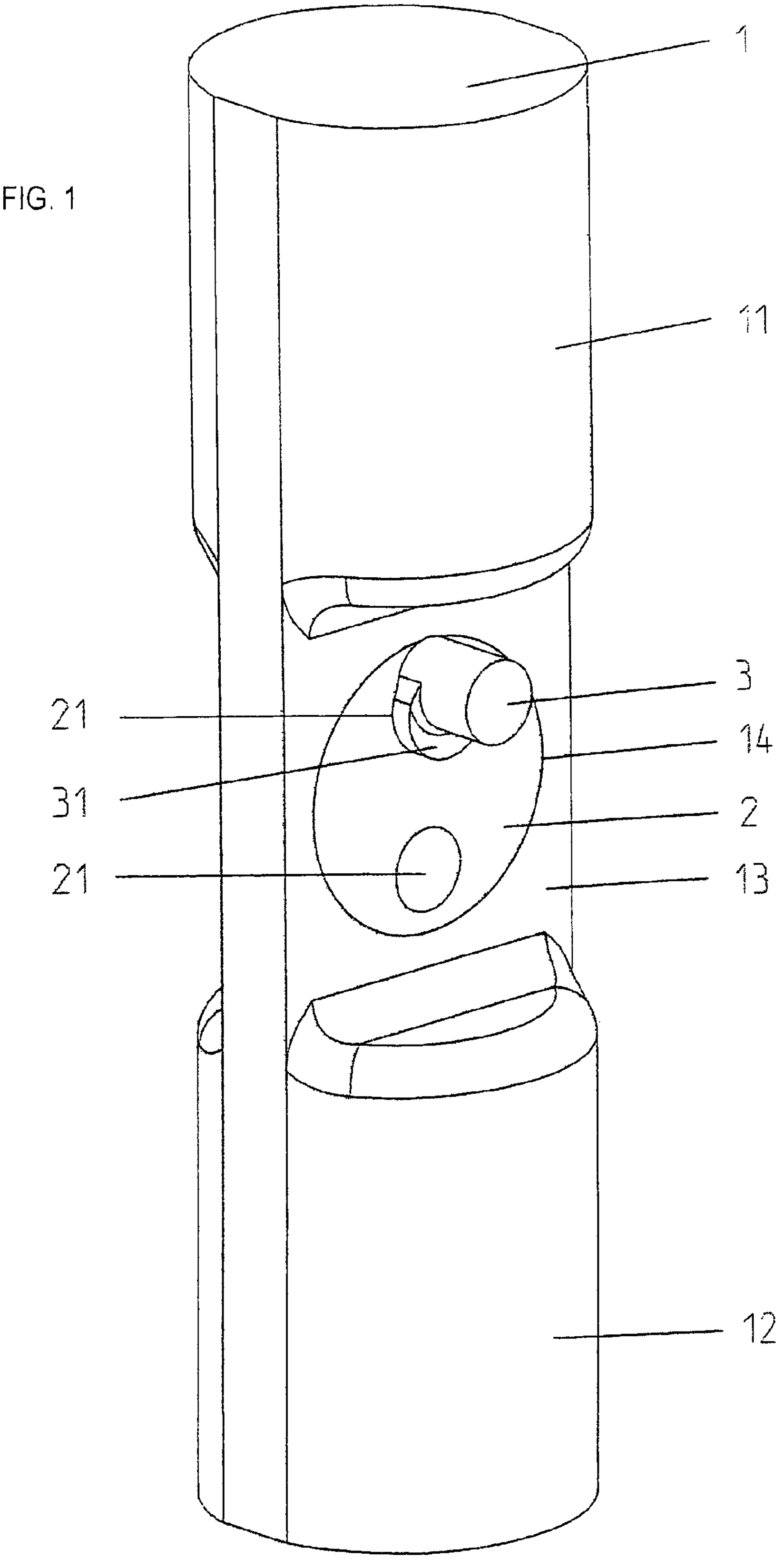
FIG. 1 shows a three-dimensional representation of a vibration generator according to one embodiment of the invention.

Referring now in detail to the drawings, the vibration generator selected as an exemplary embodiment in FIG. 1 essentially comprises a piston 1, which accommodates a connecting rod disk 2 mounted in moveable manner in a slide bearing, in which disk, in turn, a crankshaft 3 is disposed.

Piston 1 is configured as an essentially symmetrical body. Cylindrically configured end pieces 11, 12 follow on both sides of a center piece 13 that is configured essentially in block shape. Within center piece 13, a piston pin bearing 14 is introduced, in a centered manner, which accommodates a circular connecting rod disk 2. The cylindrical end pieces 11, 12 are configured to be solid in the exemplary embodiment.

Connecting rod disk 2, structured in circular manner, has a depth that essentially corresponds to the depth of center piece 13 of piston 1. Two crank journal bearings 21 for accommodating crank journal 31 of crankshaft 3 are introduced eccentrically into the connecting rod disk, diametrically opposite one another.

Figure 3:
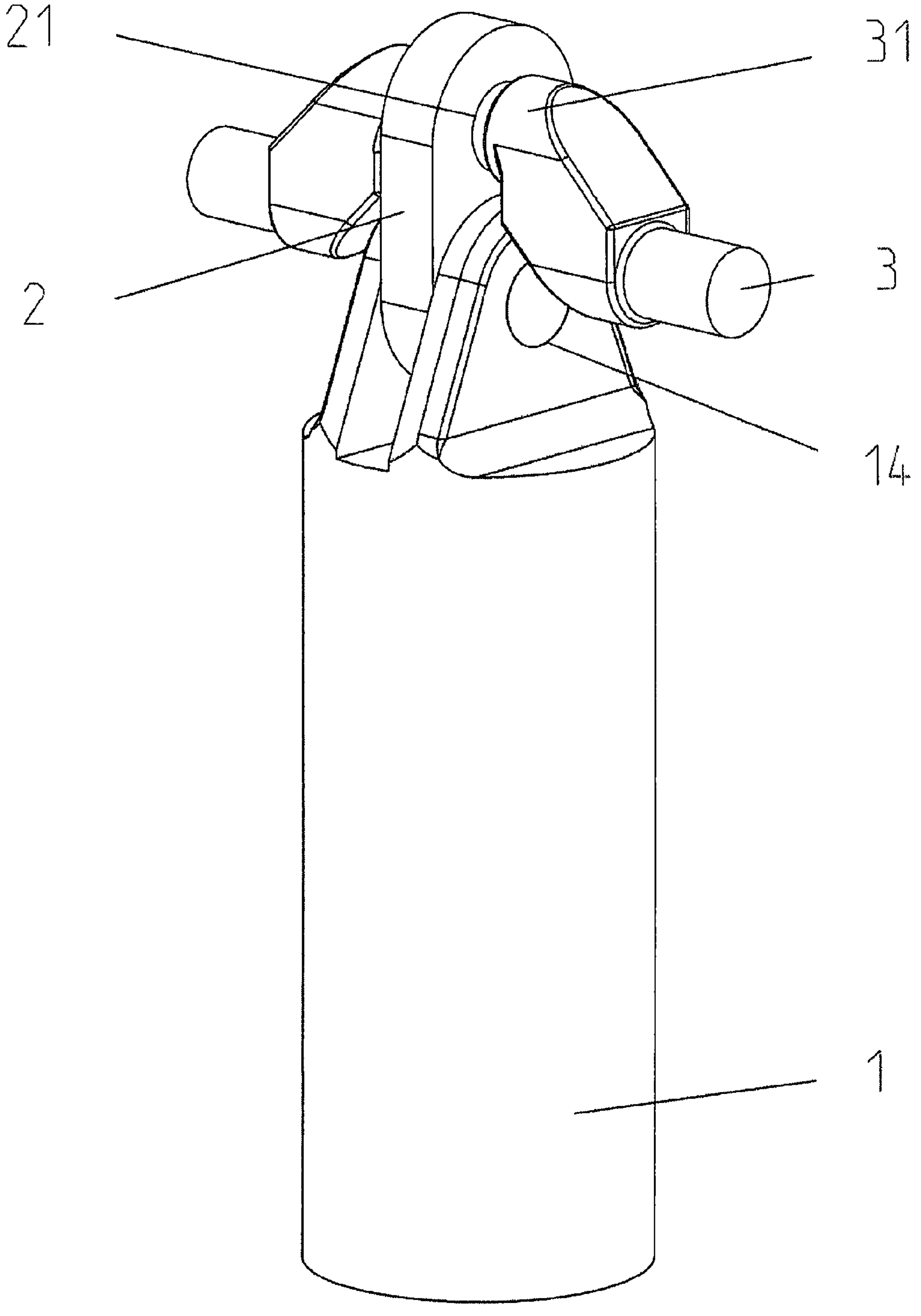
FIG. 3 shows the schematic representation of a rotating slider crank mechanism (state of the art).

The method of functioning of the vibration generator according to FIG. 1 will be explained in the following, in a comparison with a rotating slider crank mechanism known from the state of the art according to FIG. 3: When crankshaft 3 is put into rotation, an up and down movement of piston 1, which is guided in a linear manner, takes place by way of connecting rod 2. In the state of the art according to FIG. 3, crank journal 31 of crankshaft 3 is connected with connecting rod 2 by way of a crank journal bearing 21; piston 1 is connected with connecting rod 2 by way of a piston pin that is disposed in piston pin bearing 14 of connecting rod 2. In the exemplary embodiment according to FIG. 1, piston pin bearing 14 is enlarged to such an extent that it goes beyond crank journal bearing 21. At the same time, the piston is lengthened in such a manner that the crankshaft is disposed in a centered manner. Since the connecting rod forces engage in the center of piston 1, the bearing forces between piston 1 and the cylinder in which piston 1 is guided—not shown—are reduced. In this connection, connecting rod 2 is configured as a disk that moves in a slide bearing, in alternating manner. Because of the slide bearing, practically no noise development occurs. In place of the slide bearing, roller bearings, for example needle bearings, can also be provided. The connecting rod length is independent of the bearing diameters, and is only limited by the crank radius. If the crankshaft is mounted in lower crank journal bearing 21 of connecting rod disk 2, a direction reversal of the work direction of piston 1 is brought about.

Figure 2:
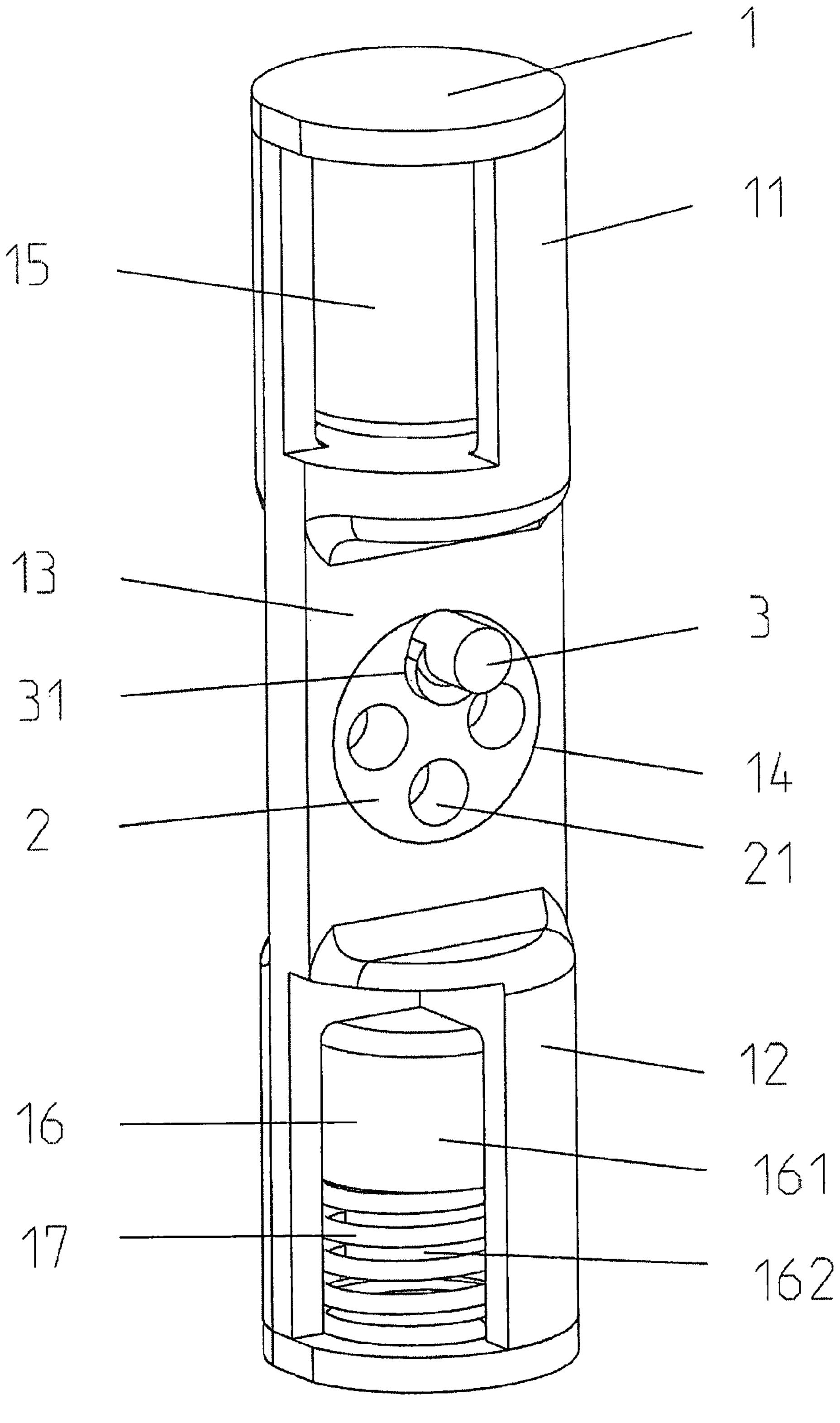
FIG. 2 shows the representation of a vibration generator in another embodiment.

In the exemplary embodiment according to FIG. 2, end pieces 11, 12 of piston 1 are configured to be hollow. A cylindrically configured mass piece 15 is disposed within end piece 11. An impact piece 16 is introduced within end piece 13 of piston 1 disposed on the opposite side, which impact piece is resiliently mounted within end piece 12 by way of a helical spring 17. Impact piece 16 is configured in mushroom-like manner in the exemplary embodiment, whereby mushroom head 161 rests on helical spring 17 into which stem 162 of impact piece 16 engages. Spring 17 is configured in such a manner that stem 162 of impact piece 16 reaches the housing of end piece 12 and supports it in the pile-driving direction when hard impacts occur.

In a further embodiment of the invention—not shown—it is also possible to introduce an oblong hole into connecting rod disk 2 in place of multiple crank journal bearings, in which hole a slide piece that accommodates a crank journal bearing is disposed. On both sides of the slide piece, hydraulic cylinders are provided, by way of which the slide piece can be moved in the oblong hole. By way of the hydraulic cylinders, each of the crank journal bearing can be displaced into the end positions within the oblong hole, thereby making it possible to achieve a direction reversal of the working direction of the vibration generator, without further conversion measures.

Accordingly, while only a few embodiments of the present invention have been shown and described, it is obvious that many changes and modifications may be made thereunto without departing from the spirit and scope of the invention.

What is claimed is:

1. A vibration generator for a vibrator, shaker or vibration driver for introducing profiles into the ground, removing the profiles, and compacting the ground material, comprising:
- a piston guided in a linear manner;
- a connecting rod connected to the piston by a piston pin bearing; and
- a crankshaft connected with the connecting rod by a crank journal having two crank journal bearings,
- wherein the crank journal bearings are disposed diametrically opposite one another within the piston pin bearing.

2. The vibration generator according to claim 1, wherein the crankshaft is disposed in a center of the piston.

3. The vibration generator according to claim 1, wherein the connecting rod is configured as a disk.

4. The vibration generator according to claim 1, wherein the crank journal bearings are displaceable within the piston pin bearing.

5. The vibration generator according to claim 4, wherein the connecting rod has means for a relative change in position of the crank journal bearing.

6. The vibration generator according to claim 5, wherein the means for the relative change in position comprise a hydraulic cylinder that is disposed orthogonal to the crank journal.

7. The vibration generator according to claim 1, further comprising a resiliently mounted impact piece disposed within the piston.

* * * * *

UNITED STATES PATENT AND TRADEMARK OFFICE

CERTIFICATE OF CORRECTION

PATENT NO. : 8,276,471 B2
APPLICATION NO. : 12/456842
DATED : October 2, 2012
INVENTOR(S) : Heichel et al.

It is certified that error appears in the above-identified patent and that said Letters Patent is hereby corrected as shown below:

In particular, on the Title page, Column 1, Item [73], the name of the Assignee should correctly read:

--ABI Anlagentechnik-Baumaschinen-Industriebedarf Maschinenfabrik und Vetrlebsgesellschaft mbH--.

Signed and Sealed this
Fifth Day of February, 2013

Teresa Stanek Rea
*Acting Director of the United States Patent and Trademark Office*